United States Patent [19]

Takemasa

[11] Patent Number: 4,677,902
[45] Date of Patent: Jul. 7, 1987

[54] DEODORIZING DEVICE OF AN AIR CONDITIONING SYSTEM FOR AUTOMOTIVE VEHICLES

[75] Inventor: Masami Takemasa, Konan, Japan

[73] Assignee: Diesel Kiki Co., Ltd., Tokyo, Japan

[21] Appl. No.: 809,526

[22] Filed: Dec. 16, 1985

[30] Foreign Application Priority Data

Dec. 18, 1984 [JP] Japan ............... 59-190849[U]
Dec. 18, 1984 [JP] Japan ............... 59-190850[U]
Dec. 18, 1984 [JP] Japan ............... 59-190851[U]

[51] Int. Cl.[4] .................................................. B60H 3/00
[52] U.S. Cl. .................................... 98/2.11; 62/78; 422/124
[58] Field of Search ............. 62/78, 171; 98/2.01, 98/2.11; 422/123, 124

[56] References Cited

U.S. PATENT DOCUMENTS

| 3,259,050 | 7/1966 | Grimm, III ......................... 98/2.11 |
| 4,309,382 | 1/1982 | Miller ............................. 422/124 X |
| 4,340,112 | 7/1982 | Sutoh et al. ...................... 98/2.11 X |
| 4,346,048 | 8/1982 | Gates ............................. 98/2.11 X |

FOREIGN PATENT DOCUMENTS 59-118520 9/1984 Japan.

*Primary Examiner*—Harold Joyce
*Attorney, Agent, or Firm*—Frishauf, Holtz, Goodman & Woodward

[57] ABSTRACT

When a power switch of a blower and a second mode switch are both turned on, a door at the exit of a deodorizer containing a volatile deodorant is opened to allow the deodorant to volatilize and diffuse into an air blast duct through a passage extending between the deodorizer and the duct, whereby the deodorant deodorizes the air to be blown into the passenger compartment. The second mode switch is any one of the power switch for the air conditioning system, the power switch for a driving device to open and close the door, and the mode switch to select a upward blower outlet.

6 Claims, 4 Drawing Figures

DEODORIZING DEVICE OF AN AIR CONDITIONING SYSTEM FOR AUTOMOTIVE VEHICLES

BACKGROUND OF THE INVENTION

This invention relates to a deodorizing device of an air conditioning system for use in automotive vehicles which is adapted to remove unpleasant odors in the air which is blown into a passenger compartment.

Deodorizing devices of air conditioning systems for automotive vehicles have been known, e.g. one disclosed by Japanese Provisional Patent Publication (Kokai) No. 59-118520. These conventional deodorizing devices are arranged such that deodorization is effected by automatically opening for a predetermined period of time, e.g. 10 seconds, a door across a communication port communicating the interior of the deodorizing device with an air passage in the air blast duct to thereby let deodorant volatilize and diffuse, from the time the actuator switch for the air conditioning system is turned on, as well as when the compressor is stopped by turning off the actuator switch for the air conditioning system. Therefore, the concept of these conventional deodorizing devices is to effect deodorization only when unpleasant smell carried by malodorous molecules leaving the surfaces of the evaporator are statistically strongest, that is, at the start of the operation of the air conditioning system and also at the time when the actuator switch for the air conditioning system is opened to bring the compressor to a halt, and hence the conventional deodorizing devices is not adapted to positively prevent malodorous molecules from sticking to the evaporator, which is the main source of unpleasant odor.

Since the deodorant does not diffuse due to closure of the above-mentioned door while the air conditioning system is continuously operating, it is not possible to kill unpleasant odor even if they spread while the door is closed (which happens particularly when the evaporator is moistened due to high humidity in rainy weather or a like condition.

Further, according to the conventional deodorizing devices, even when no malodor is produced at the start of the operation of the air conditioning system or at the time the actuator switch for the air conditioning system is opened to bring the compressor to a halt, the door, interlocked with the actuator switch, is automatically opened to let the deodorant volatilize and diffuse. This results not only in a waste of deodorant, but also in that the passenger compartment is filled with odor from the deodorant itself which can be unpleasant to the passengers, especially when malodor is absent.

SUMMARY OF THE INVENTION

It is an object of the invention to provide a deodorizing device of an air conditioning system for use in automotive vehicles which is capable of positively preventing malodorous molecules from sticking to the evaporator, which is the main source of unpleasant odor.

It is another object of the invention to provide a deodorizing device of an air conditioning system for use in automotive vehicles which is capable of solving the problems of wasteful use of the deodorant and the unpleasantness caused by the smell of deodorant itself.

According to the invention, a deodorizing device of an air conditioning system is provided for use in an automotive vehicle, the air conditioning system including a housing having an air passage defined therein and at least one air outlet at a downstream end portion of the air passage for discharge of air into a passenger compartment of the automotive vehicle, an evaporator arranged in the air passage of the housing, a blower arranged in the air passage of the housing at a location upstream of the evaporator, and a power switch for selectively activating and deactivating the blower. The deodorizing device comprises: a casing; communication passage means communicating the interior of the casing with the air passage in the housing at a location upstream of the evaporator; a volatile deodorant accommodated in the casing; door means adapted to selectively open and close the communication passage means; and driving means responsive to turning on and turning off of the power switch and a second switch, for driving the door means to selectively open and close. The driving means is adapted to open the door means when both the power switch and the second switch are closed.

The second switch may comprise a power switch adapted to activate the air conditioning system when turned on, and deactivate the system when turned off.

The second switch may comprise a power switch adapted to activate the driving means when turned on, and deactivate the driving means when turned off.

The at least one air outlet of the air conditioning system may include an upwardly directed outlet port disposed to discharge air upward into the passenger compartment, and the air conditoning system includes a mode switch which, when turned on, selects the upwardly directed outlet port, and the second switch is the mode switch.

The above and other objects, features and advantages of the invention will be more apparent from the ensuing detailed description taken in conjunction with the accompanying drawings.

DETAILED DESCRIPTION

The invention will now be described in detail with reference to the drawings showing embodiments thereof.

Figure 1:
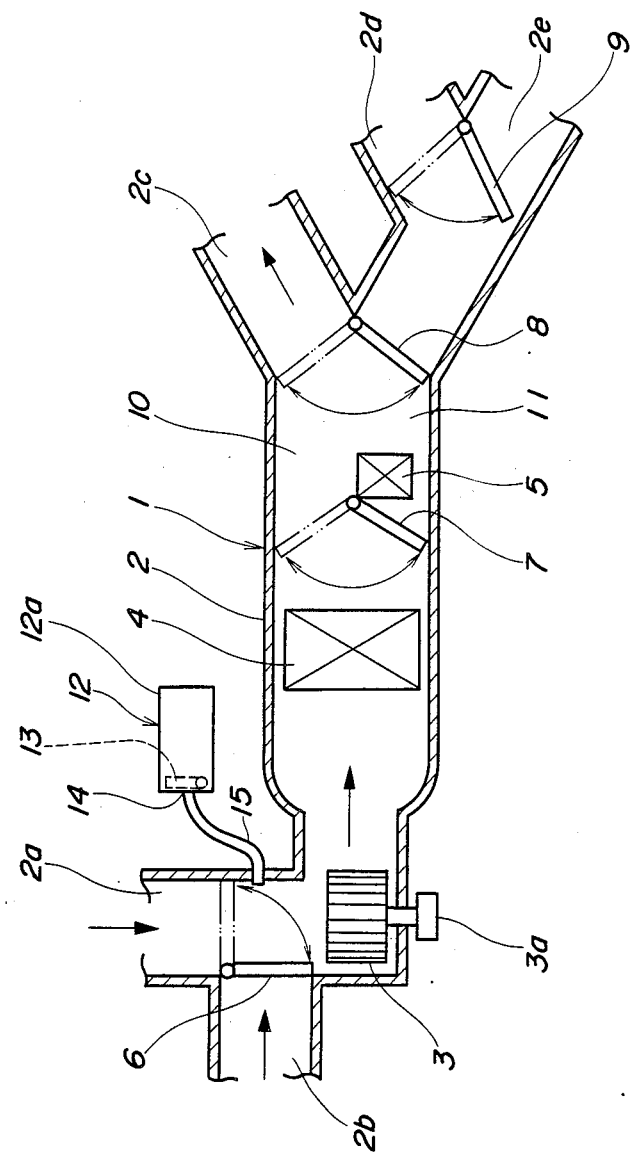
FIG. 1 is a block diagram showing the whole arrangement of an air conditioning system for automotive vehicles equipped with the deodorizing device according to the invention.

FIG. 1 schematically illustrates an air conditioning system for automotive vehicles provided with a deodorizing device of the invention. Reference numeral 1 designates the whole arrangement of the air conditioning system, which has a blower 3, an evaporator 4, and a heater core 5 arranged in this order from upstream in its housing 2 in the form of a duct. The air conditioning system 1 is further provided with a damper 6 at the inlet of the duct 2, a damper 7 at the heat core 5, and dampers 8 and 9 at the outlet. Fresh air and recirculated air from the passenger compartment are selectively introduced into the duct 2 by means of the damper 6 at the inlet, through a fresh or external air inlet port 2a and a recirculated or internal air inlet port 2b, respectively, and the selected intake air is selectively directed by the damper 7 at the heat core 5 into a cold air passage 10 or a warm air passage 11 to reach downstream end portion of the duct 2, where they are discharged into the passenger compartment through one of outlet ports, namely a first upward discharge outlet port 2c, a second upward discharge outlet port 2d, and a downward discharge outlet port 2e, which is selectively opened depending on the positions of the dampers 8 and 9 at the outlet.

In the air conditioning system 1, malodorous molecules generating unpleasant odor stick on the evaporator 4 in more quantities than the other parts. A deodorizer 12 is arranged for communication through a hose 15 with the interior of the duct 2 at a location upstream of the evaporator 4. The deodorizer 12 comprises a communication port 14 provided with a door 13, and an airtight casing 12a which accommodates a volatile deodorant 16. The door 13 is selectively opened and closed by a driving device 17 (shown in FIG. 2), which comprises a control circuit 17b, and an electric motor 17a electrically connected with the control circuit 17b.

The control circuit 17b is disposed to be actuated in response to closing (i.e. turning on) of a power switch 18 the air conditioning system 1. That is, an input terminal of the control circuit 17b is connected to the junction between a movable contact 19a of a relay 19 and a fixed contact 20a of a thermostatic switch 20 connected in series with the relay 19, the relay 19 and the switch 20 forming components of the air conditioning system 1. The fixed contact 19b of the relay 19 is connected to an output terminal of a battery 21, and a movable contact 20b of the thermostatic switch 20 is grounded through a magnetic clutch 22 of the compressor (not shown). The thermostatic switch 20 is disposed to close (turn on) and open (turn off) in response to an output signal from a refrigerant exit temperature sensor (not shown) of the evaporator 4. To be specific, when the refrigerant exit temperature becomes lower than a predetermined value (e.g. 0° C.), the thermostatic switch 20 opens to disengage the magnetic clutch 22 whereby the compressor is brought to a halt and thus the evaporator 4 is prevented from freezing.

A movable contact 18a of the power switch 18 for the air conditioning system 1 is connected to one end of a coil 19c of the relay 19, and a fixed contact 18b of the power switch 18 is connected to the output terminal of the battery 21. The other end of the coil 19c of the relay 19 is connected to a main fixed contact 23o of a power switch 23 of the blower 3. The power switch 23 of the blower 3 comprises one main fixed switch 23o, four, or first through fourth, fixed contacts 23a through 23d, and one movable contact 23e. The first fixed contact 23a is connected to an end of a field winding of an electric motor 3a of the blower 3 via first through third resismotors 24a through 24c connected in series. The other end of the field winding of the motor 3a is connected to the output terminal of the battery 21. The second fixed contact 23b is connected to the junction between the first resistor 24a and the second resistor 24b. The third fixed contact 23c is connected to the junction between the second resistor 24b and the third resistor 24c. The fourth fixed contact 23d is connected to the junction between the third resistor 24c and the motor 3a of the blower 3. The movable contact 23e is grounded. The movable contact 23e is disposed to selectively contact one of the four fixed contacts 23a through 23d, and when in contact with any one of the four fixed contacts it is at the same time in contact with the main fixed contact 23o. By changing the contact position of the movable contact 23e it is possible to vary the rotational speed of the motor 3a of the blower 3 among levels.

Connected between the motor 3a of the blower 3 and the output terminal of the battery 21 are an ignition switch 25 and a fuse 26 of an internal combustion engine (not shown) installed on the automotive vehicle.

Next, the operation of the deodorizing device of the air conditioning system constructed as above will be explained. When at least one of the power switch 18 of the air conditioning system 1 and the power switch 23 of the blower 3 is open, with the ignition switch 25 closed, the coil 19c of the relay 19 is deenergized to thereby open the relay 19. On this occasion, if the refrigerant exit temperature of the evaporator 4 exceeds the predetermined value (e.g. 0° C), the thermostatic switch 20 is closed. Since the relay 19 is open as noted above, the control circuit 17b causes the motor 17a to hold the door 13 in the closed position, as shown by the solid line in FIG. 2, whereby deodorization is not effected.

Then, with this position, if the power switch 23 of the blower 3 is closed, the blower 3 is actuated, and on this occasion, if the power switch 18 of the air conditioning system 1 is closed, the relay 19 is energized or closed to thereby cause the magnetic clutch 22 to engage, whereupon the compressor starts operating to actuate the air conditioning system 1. Responsive to closing of the relay 19 caused by closing of the power switch 18, the control circuit 17b causes the motor 17a to drive the door 13 to assume the open position, as shown by the two-dot chain line in FIG. 2, whereupon the deodorant 16 is allowed to volatilize and diffuse through the communication port 14 and the hose 15 into the duct 2 at a location immediately upstream of the blower 3, and then it reaches the evaporator 4 to react with and thus deodorize the malodorous molecules on the surfaces of the evaporator 4. As a result, the evaporator 4 stops releasing unpleasant odor, so that the air blown into the passenger compartment through the outlet ports 2c, 2d, and 2e loses unpleasant odor.

With this position, if the power switch 18 of the air conditioning system 1 is opened to thereby open the relay 19, the magnetic clutch 22 is disengaged to bring the compressor to a halt. Also, opening of the power switch 23 causes the blower 3 to stop. When the power switch 18 of the air conditioning system 1 is thus opened to thereby open the relay 19, the control circuit 17b causes the motor 17a to drive the door 13 to assume the closed position, as shown by the solid line in FIG. 2, to thereby stop volatilization and diffusion of the deodorant 16 whereby no deodorization takes place.

When the power switch 23 is closed, with the air conditioning system 1 at rest (i.e. with the power switch 18 open), only the blower 3 operates. On this occasion, since the evaporator 4 itself is not in a cooled state, it does not carry unpleasant odor and hence the air blown into the passenger compartment is free of unpleasant odor. On the other hand, while the air conditioning system 1 is operating, if the refrigerant exit temperature of the evaporator 4 drops below the predetermined value (e.g. 0° C.), the thermostatic switch 20 turns off to disengage the magnetic clutch 22, whereupon the compressor ceases to operate, and then when the refrigerant exit temperature again rises above the predetermined value, the thermostatic switch 20 again turns on to engage the magnetic clutch 22, whereupon the compressor resumes its operation. In this way, the compressor 4 is repeatedly operated to prevent freezing of the evaporator 4.

This embodiment is based upon the recognition that more malodorous molecules are apt to be stuck to the surfaces of a cooled body. According to the embodiment, therefore, the deodorant is volatilized and diffused into the duct 2 from a location upstream of the evaporator 4 while the evaporator 4 of the air conditioning system is in a cold state. The volatilized and diffused deodorant can effectively attack and deodorize malodorous molecules on the evaporator 4 such as those from human sweat, cigarette smoke and the remnants of aromatics existing in the passenger compartment. Incidentally, while only the blower 3 is operated, no deodorization is effected, but since on this occasion the evaporator is not cold, odor is not so appreciably strong.

Figure 2:
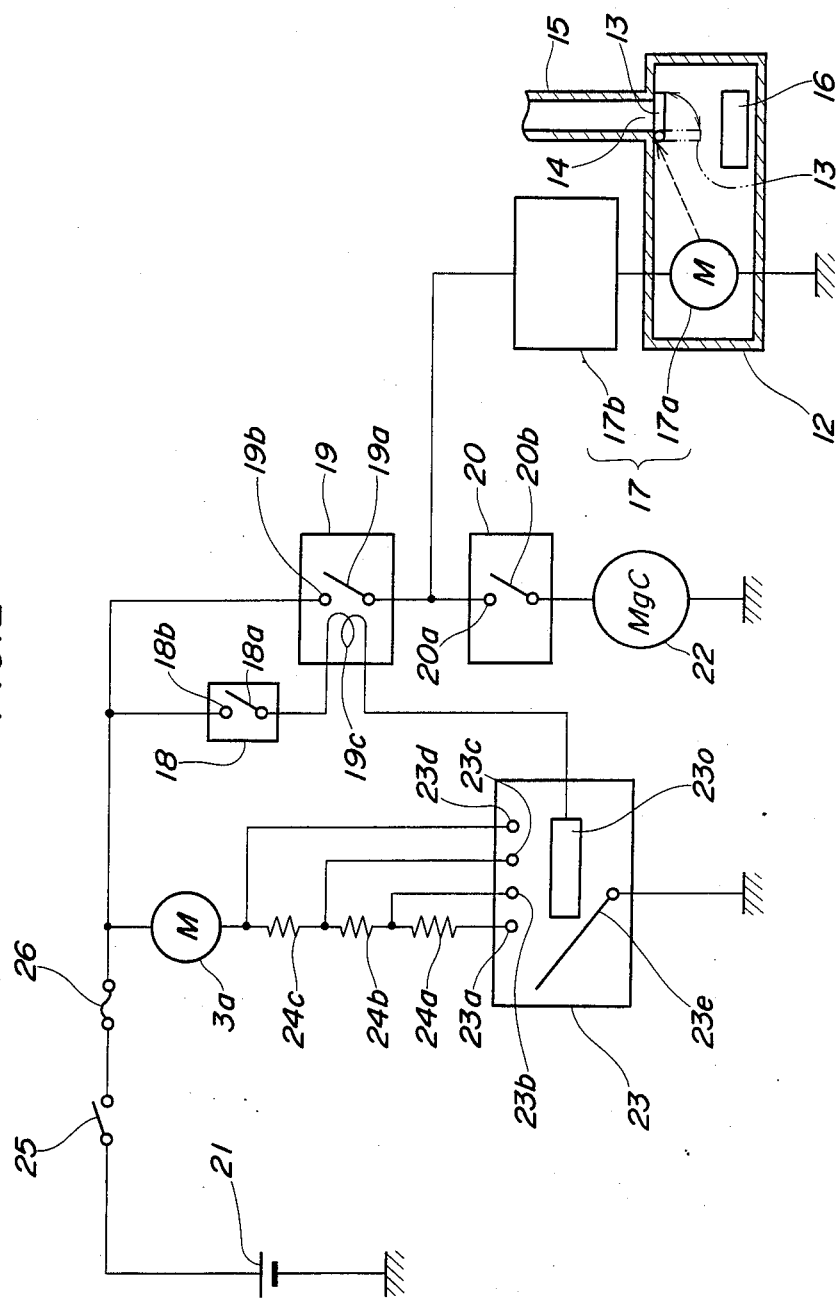
FIG. 2 is a circuit diagram showing the electrical circuitry of the air conditioning system, showing a first embodiment of the invention.
Figure 3:
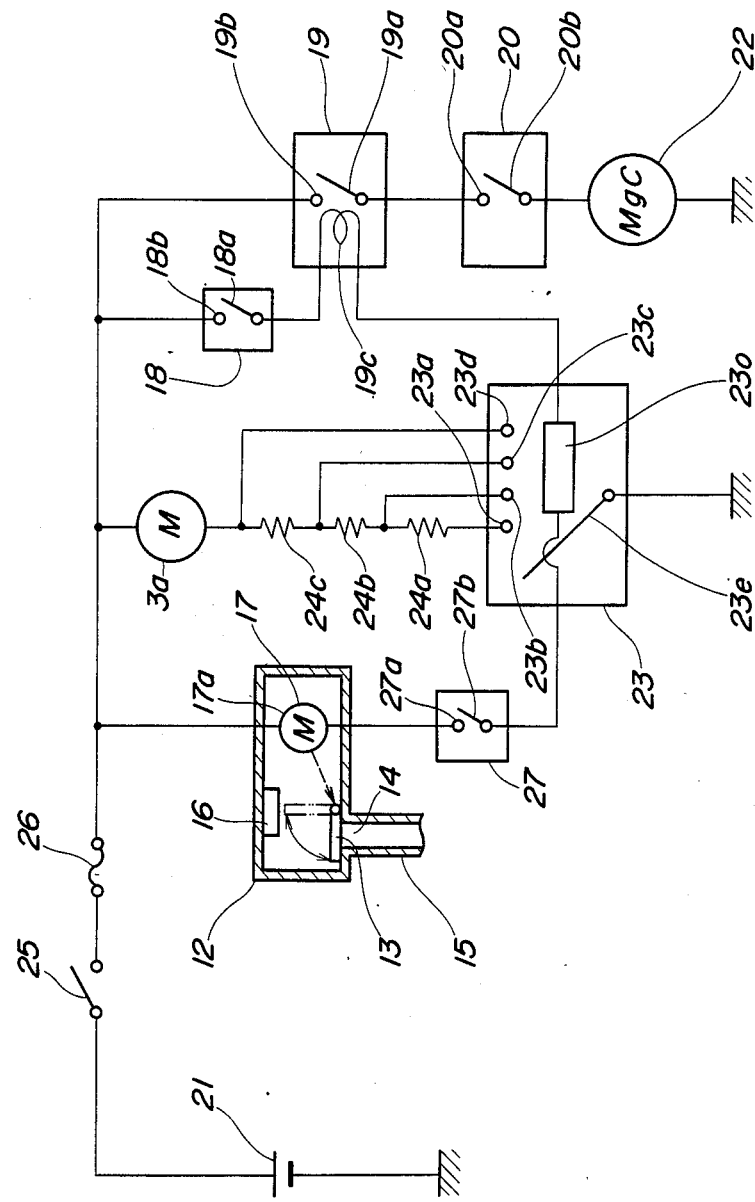
FIG. 3 is a circuit diagram similar to FIG. 2, showing a second embodiment of the invention.

FIG. 3 shows a second embodiment of the invention. Incidentally, corresponding elements and parts to those in FIG. 2 are designated by identical reference characters, and detailed description thereof is omitted. This embodiment is distinct from the first embodiment in that the driving device 17 for the deodorizer 12 is solely formed of the motor 17a, and that one end of the field winding of the motor 17a is connected to the junction between the motor 3a of the blower 3 and the fuse 26, while the other end of the field winding of the motor 17a is connected to the main fixed contact 23o of the power switch 23 of the blower 3 via a power switch 27 for the driving device 17.

The motor 17a of the driving device 17 is drivingly connected to the door 13 of the deodorizer 12 such that the door 13 is opened by the motor 17a when the latter is actuated, while the former is closed when the latter is deactivated. Accordingly, when at least one of the power switch 18 of the air conditioning system 1 and the power switch 23 of the blower 3 is open, with the ignition switch 25 closed, the door 13 is held in the closed position, as shown by the solid line in FIG. 3, whereby no deodorization is carried out, similarly as in the first embodiment.

With this position, when the power switch 23 of the blower 3 is closed, the blower 3 is actuated, and then if the power switch 18 of the air conditioning system 1 is closed, the relay 19 is closed to thereby cause the magnetic clutch 22 to engage, whereupon the compressor starts operating to actuate the air conditioning system 1. On this occasion, if the passenger senses unpleasant ordor, he can turn on the power switch 27 of the driving device 17, which together with the closed power switch 23 of the blower 3 causes the motor 17a of the driving device 17 to drive the door 13 to the open position, as shown by the two-dot chain line in FIG. 3, and consequently deodorization is effected similarly as in the first embodiment.

On this occasion, if at least one of the power switch 27 of the driving device 17 and the power switch 23 of the blower 3 of the air conditioning system 1 is opened, the motor 17a is actuated to drive the door 13 to the closed position, as shown by the solid line in FIG. 3, whereupon volatilization and diffusion of the deodorant 16 into the duct 2 are stopped, and no deodrization is effected.

According to the second embodiment, since the deodorant can be volatilized and diffused only when the passenger feels it necessary to effect deodorization, wasteful use of the deodorant and unpleasantness caused by the smell of the deodorant itself can be avoided.

Figure 4:
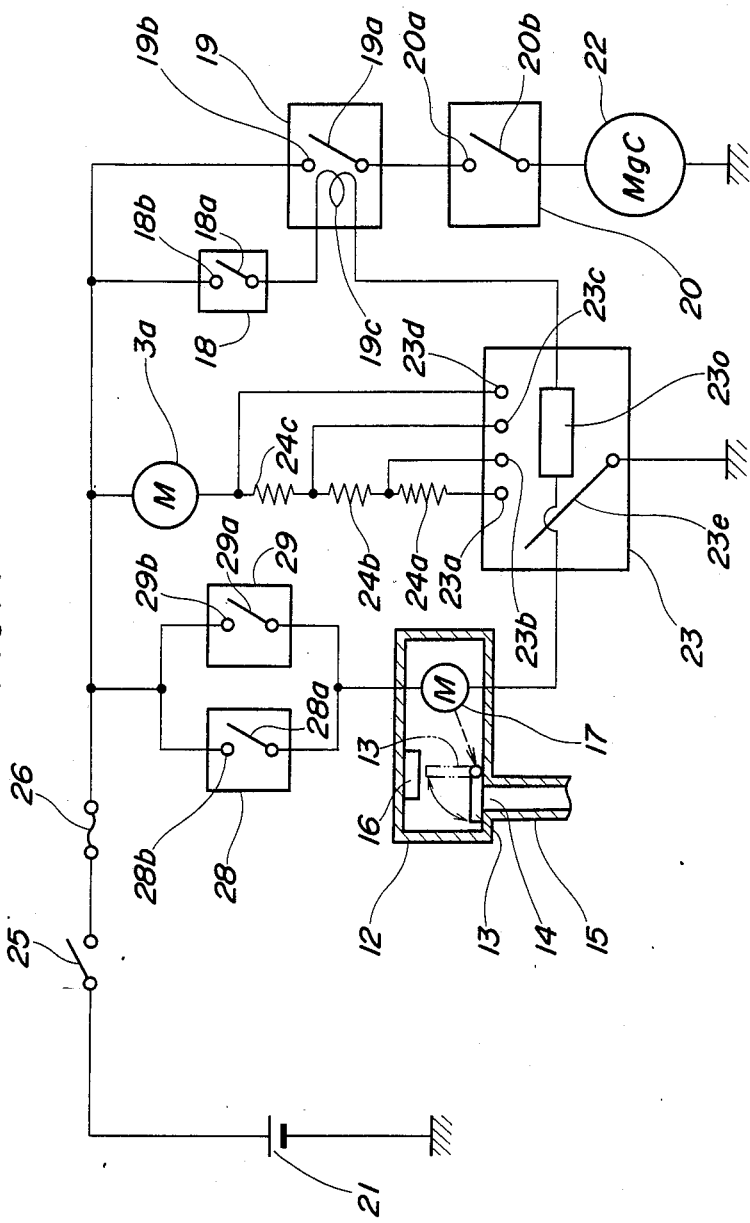
FIG. 4 is a circuit diagram similar to FIG. 2, showing a third embodiment of the invention.

FIG. 4 shows a third embodiment of the invention. Again, corresponding elements and parts to those in FIG. 2 are designated by identical reference characters, and detailed description thereof is omitted. This embodiment is distinct from the first embodiment in that the driving device 17 is solely formed of the motor 17a, one end of the field winding of the motor 17a is connected to a the movable contact 28a of a first mode switch 28 for an upward blow mode and a movable contact 29a of second mode switch 29 for selecting an upward/downward blow mode, respectively, the mode switches 28 and 29 being connected in parallel with each other, and fixed contacts 28b and 29b of the respective first and second mode switches 28 and 29 are connected to the output terminal of the battery 21 via the fuse 26 and the ignition switch 25. The first mode switch 28 and the second mode switch 29 are interlocked with the damper 8 in FIG. 1 such that when the first mode switch 28 is closed the damper 8 assumes the position shown by the solid line in FIG. 1, whereas when the second mode switch 29 is closed the damper 8 assumes the other position shown by the two-dot chain line. Also, like the second embodiment, the motor 17a of the driving device 17 is arranged such that when it is energized the door 13 is opened, while when the former is deenergized, the latter is closed.

With the above arrangement, like the first embodiment 1, when, with the ignition switch 25 closed, the power switch 23 of the blower 3 is open, the door 13 is held in the closed position, as shown by the solid line in FIG. 4, to thereby inhibit deodorization.

When the power switch 23 of the blower 3 is closed, the blower 3 is caused to operate, and on this occasion if the power switch 18 of the air conditioning system 1 is closed, the relay 19 is closed to thereby engage the magnetic clutch 22, whereupon the compressor starts operating to actuate the air conditioning system 1. With this position, if either the first mode switch 28 or the second mode switch 29 is closed to thereby blow the air into the passenger compartment in the upward blow mode or in the upward/downward blow mode, respectively, then either the first mode switch 28 or the second mode switch 29 as well as the power switch 23 of the blower 3 are closed. Accordingly, the motor 17a of the driving device 17 is actuated to drive the door 13 to the opening position, as shown by the two-dot chain line in FIG. 4, and consequently deodorization is effected, similarly as in the first embodiment.

On this occasion, if the first and second mode switches 28 and 29 are both opened or the power switch 23 of the blower 3 is opened, the door 13 is restored to the closed position, as shown by the solid line in FIG. 4, whereupon volatilization and diffusion of the deodorant 16 into the duct 2 are stopped, and no deodrization is effected.

When the power switch 23 of the blower 3 is closed, with the air conditioning system 1 at rest (i.e. with the power switch 18 open), only the blower 3 operates. Even on this occasion, if either the first or the second mode switch 28 or 29 is closed, the door 13 is opened to effect deodorization, since the power switch 23 of the blower 3 is already closed.

According to the third embodiment, as noted above, the deodorant can be volatilized and diffused only when the air blow mode is such that the air is blown into the passenger compartment through an upwardly directed outlet port, in which mode usually the air is most malodorous, making it possible to solve the problems of wasteful use of deodorant and unpleasantness felt by the passengers due to the smell of deodorant itself.

What is claimed is:

1. A deodorizing device of an air conditioning system for use in an automotive vehicle, said air conditioning system including a housing having an air passage defined therein and at least one air outlet at a downstream end portion of said air passage for discharge of air into a passenger compartment of said automotive vehicle, an evaporator arranged in said air passage of said housing, a blower arranged in said air passage of said housing at a location upstream of said evaporator, and a power switch for selectively activating and deactivating said blower, said deodorizing device comprising:
a casing;
communication passage means communicating the interior of said casing with said air passage in said housing at a location upstream of said evaporator;
a volatile deodorant accommodated in said casing;
door means adapted to selectively open and close said communication passage means; and
driving means responsive to turning on and turning off of said power switch and a second switch, for driving said door means to selectively open and close, said driving means being adapted to open said door means when both said power switch and said second switch are turned on.

2. A deodorizing device as claimed in claim 1, wherein said second switch comprises a further power switch adapted to activate said air conditioning system when turned on, and deactivate said system when turned off.

3. A deodorizing device as claimed in claim 1, wherein said second switch comprises a further power switch adapted to activate said driving means when turned on, and deactivate said driving means when turned off.

4. A deodorizing device as claimed in claim 1, wherein said at least one air outlet of said air conditioning system includes an upwardly directed outlet port disposed to discharge air uwpard into said passenger compartment, and said air conditioning system includes a mode switch which, when turned on, selects said upwardly directed outlet port, said second switch being said mode switch.

5. A deodorizing device as claimed in claim 1, wherein said driving means opens said door means at least when said evaporator is operating so that it is in a cold state.

6. A deodorizing device as claimed in claim 1, wherein said driving means keeps said door means open while both said power switch and said second switch are turned on.

* * * * *